United States Patent
Hotelling et al.

(10) Patent No.: US 9,632,622 B2
(45) Date of Patent: Apr. 25, 2017

(54) GROUND DETECTION FOR TOUCH SENSITIVE DEVICE

(75) Inventors: Steven Porter Hotelling, San Jose, CA (US); David T. Amm, Sunnyvale, CA (US); Michael Lammers, San Jose, CA (US); John T. Orchard, Emerald Hills, CA (US); Brian Michael King, Santa Cruz, CA (US); Omar Leung, Palo Alto, CA (US); Deniz Teoman, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 1257 days.

(21) Appl. No.: 12/504,639

(22) Filed: Jul. 16, 2009

(65) Prior Publication Data

US 2011/0012840 A1   Jan. 20, 2011

(51) Int. Cl.
  *G06F 3/041*  (2006.01)
  *G06F 3/044*  (2006.01)

(52) U.S. Cl.
  CPC ............ *G06F 3/0418* (2013.01); *G06F 3/044* (2013.01)

(58) Field of Classification Search
  CPC ............................... G06F 3/044; G06F 3/0418
  USPC ........ 345/173–179; 178/18.01–18.07, 19.01, 178/19.03–19.04; 463/37–38
  See application file for complete search history.

(56) References Cited

U.S. PATENT DOCUMENTS

| | | | |
|---|---|---|---|
| 3,552,687 A * | 1/1971 | Howard et al. ............... 244/184 |
| 4,825,374 A * | 4/1989 | King et al. ........................ 701/5 |
| 5,335,230 A * | 8/1994 | Crooks et al. .................. 714/48 |
| 5,463,379 A | 10/1995 | Campbell et al. | |
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |

(Continued)

FOREIGN PATENT DOCUMENTS

| CN | 101471983 A | 7/2009 |
| EP | 1 355 223 A2 | 10/2003 |

(Continued)

OTHER PUBLICATIONS

International Search Report mailed Sep. 7, 2010, for PCT Application No. PCT/US2010/041248, filed Jul. 7, 2010, one page.

(Continued)

*Primary Examiner* — Lun-Yi Lao
*Assistant Examiner* — Kelly B Hegarty
(74) *Attorney, Agent, or Firm* — Morrison & Foerster LLP

(57) ABSTRACT

Ground detection of a touch sensitive device is disclosed. The device can detect its grounded state so that poor grounding can be selectively compensated for in touch signals outputted by the device. The device can include one or more components to monitor certain conditions of the device. The device can analyze the monitored conditions to determine the grounding condition of the device. The device can apply a function to compensate its touch signal outputs if the device determines that it is poorly grounded. Conversely, the device can omit the function if the device determines that it is well grounded.

19 Claims, 8 Drawing Sheets

(56) References Cited

U.S. PATENT DOCUMENTS

| | | |
|---|---|---|
| 6,504,269 B1* | 1/2003 | Miyajima et al. ............ 307/131 |
| 6,531,885 B1* | 3/2003 | Manhaeve et al. ....... 324/762.01 |
| 6,690,387 B2 | 2/2004 | Zimmerman et al. |
| 7,015,894 B2 | 3/2006 | Morohoshi |
| 7,069,357 B2 | 6/2006 | Marx et al. |
| 7,180,508 B2* | 2/2007 | Kent et al. .................... 345/178 |
| 7,184,064 B2 | 2/2007 | Zimmerman et al. |
| 7,254,775 B2 | 8/2007 | Geaghan et al. |
| 7,663,607 B2 | 2/2010 | Hotelling et al. |
| 8,479,122 B2 | 7/2013 | Hotelling et al. |
| 8,482,544 B2* | 7/2013 | Land et al. .................... 345/174 |
| 2005/0179671 A1* | 8/2005 | DeGroot et al. ............. 345/173 |
| 2005/0212753 A1 | 9/2005 | Marvit et al. |
| 2005/0219228 A1 | 10/2005 | Alameh et al. |
| 2006/0022959 A1 | 2/2006 | Geaghan |
| 2006/0026521 A1 | 2/2006 | Hotelling et al. |
| 2006/0097991 A1 | 5/2006 | Hotelling et al. |
| 2006/0166702 A1* | 7/2006 | Dietz et al. ................... 455/566 |
| 2006/0197753 A1 | 9/2006 | Hotelling |
| 2006/0238522 A1 | 10/2006 | Westerman et al. |
| 2007/0050646 A1 | 3/2007 | Conroy et al. |
| 2007/0074913 A1* | 4/2007 | Geaghan et al. .......... 178/18.06 |
| 2007/0200831 A1* | 8/2007 | Wang ............................ 345/173 |
| 2008/0165115 A1 | 7/2008 | Herz et al. |
| 2008/0165116 A1 | 7/2008 | Herz et al. |
| 2008/0267462 A1 | 10/2008 | Nelson et al. |
| 2009/0002343 A1 | 1/2009 | Land et al. |
| 2009/0012657 A1* | 1/2009 | Knotts et al. ..................... 701/3 |
| 2009/0160787 A1 | 6/2009 | Westerman et al. |
| 2009/0174676 A1 | 7/2009 | Westerman |
| 2009/0174688 A1 | 7/2009 | Westerman |
| 2009/0181719 A1* | 7/2009 | Cho ........................... 455/556.1 |
| 2009/0194341 A1* | 8/2009 | Nousiainen ................ 178/18.01 |
| 2009/0251423 A1* | 10/2009 | Jung ............................. 345/173 |
| 2009/0284495 A1* | 11/2009 | Geaghan et al. ............. 345/174 |
| 2010/0060608 A1* | 3/2010 | Yousefpor .................... 345/174 |

FOREIGN PATENT DOCUMENTS

| | | |
|---|---|---|
| JP | 2000-163031 A | 6/2000 |
| JP | 2002-342033 A | 11/2002 |
| JP | 2006-106853 A | 4/2006 |
| KR | 2005-0039787 A | 4/2005 |
| WO | WO-2008/035235 A1 | 3/2008 |
| WO | WO-2010/030710 A1 | 3/2010 |
| WO | WO-2011/008610 A1 | 1/2011 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation,"CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

U.S. Appl. No. 12/208,324, filed Sep. 10, 2008, by M. Yousefpor.

U.S. Appl. No. 12/234,520, filed Sep. 19, 2008, by M. Yousefpor et al.

GB Search Report mailed Nov. 2, 2011, for GB Patent Application No. 1112858.4, filed Jul. 13, 2009, two pages.

GB Search Report mailed Feb. 11, 2013, for UK Application No. GB1112858.4, filed Jul. 13, 2009, three pages.

European Search Report mailed Mar. 4, 2014, for EP Patent Application No. 10169838.9, seven pages.

\* cited by examiner

GROUND DETECTION FOR TOUCH SENSITIVE DEVICE

FIELD

This relates generally to touch sensitive devices and, more particularly, to detecting a grounded state of a touch sensitive device.

BACKGROUND

Many types of input devices are presently available for performing operations in a computing system, such as buttons or keys, mice, trackballs, joysticks, touch sensor panels, touch screens and the like. Touch sensitive devices, such as touch screens, in particular, are becoming increasingly popular because of their ease and versatility of operation as well as their declining price. A touch sensitive device can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. The touch sensitive device can allow a user to perform various functions by touching the touch sensor panel using a finger, stylus or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

When the touch sensitive device is poorly grounded, recognizing a touch event can become difficult. The poor grounding can cause touch values representing the touch event to be erroneous or otherwise distorted by undesirable capacitive coupling introduced into the device. Consequently, actions to be performed based on the touch event can likewise be erroneous or otherwise distorted.

SUMMARY

This relates to ground detection for a touch sensitive device. The device can detect its grounded state so that poor grounding can be compensated for in touch signals outputted by the device. The device can include one or more components that monitor certain conditions of the device. The device can analyze the monitored conditions to determine whether the device is grounded. The device can selectively apply a function to compensate its touch signal outputs if the device determines that it is poorly grounded. Conversely, the device can selectively ignore the function if the device determines that it is well grounded. Ground detection can advantageously provide improved touch sensing and power savings by not having to repeat measurements subject to poor device grounding. Additionally, the device can more robustly adapt to various grounding conditions.

DETAILED DESCRIPTION

Figure 1:
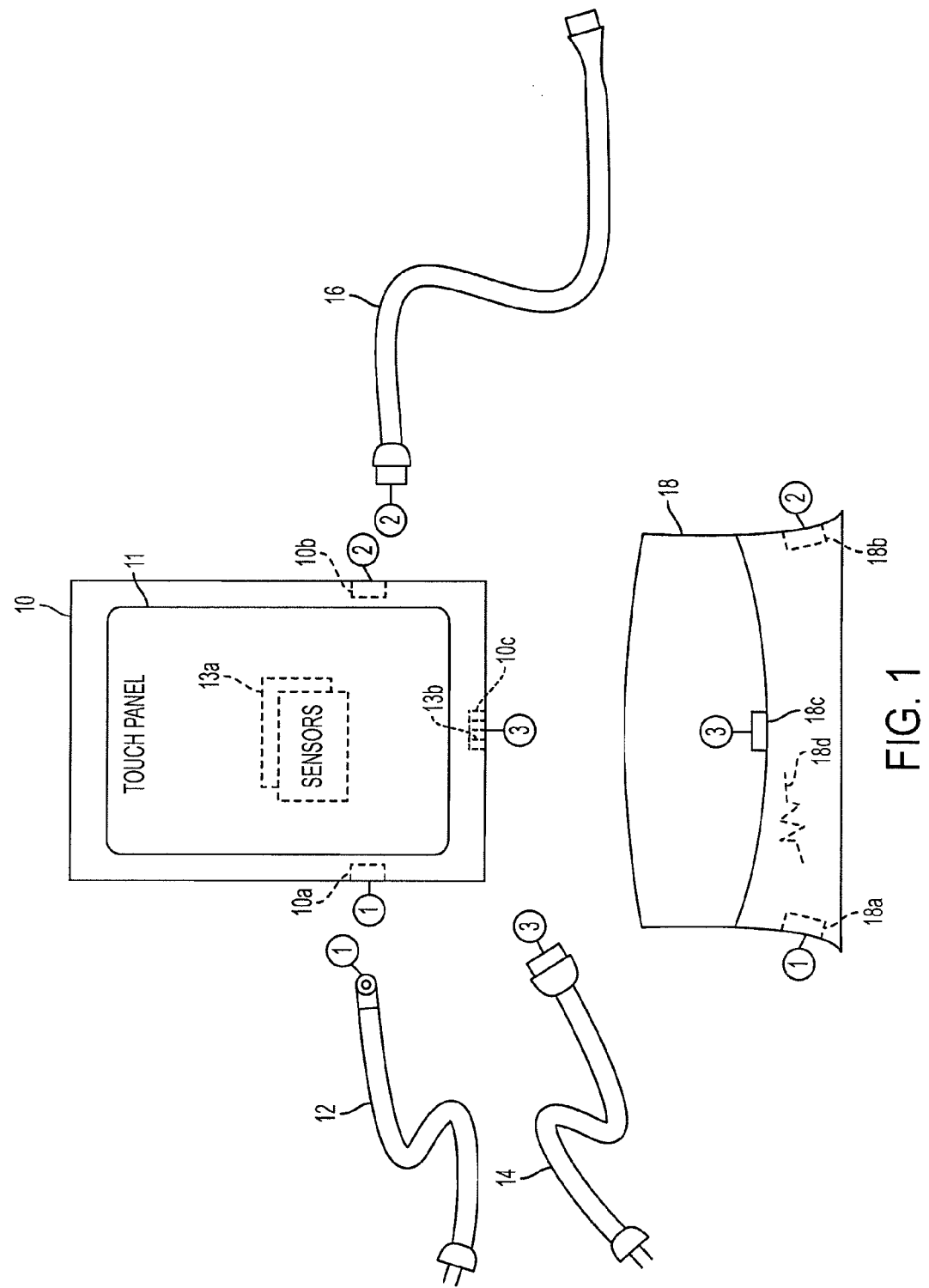
FIG. 1 illustrates an exemplary touch sensitive device having a connector sensor that can be used for detecting a grounded state of the device according to various embodiments.

In the following description of various embodiments, reference is made to the accompanying drawings which form a part hereof, and in which it is shown by way of illustration specific embodiments which can be practiced. It is to be understood that other embodiments can be used and structural changes can be made without departing from the scope of the various embodiments.

This relates to detecting a grounded state of a touch sensitive device. The device can selectively compensate touch signal outputs for error introduced into the outputs as a result of the device's grounded state. When the device is poorly grounded, the device can apply the compensation. When the device is well grounded, the device can omit the compensation. In some embodiments, to detect the grounded state, the device can check one or more parameters which can be indicative of the device's grounding. The device can analyze the parameters' values to determine whether the device is grounded. The device can selectively apply the compensation in accordance with the grounded determination.

The ability to detect how well grounded a touch sensitive device is can advantageously provide more accurate and faster touch sensing by not having to repeat measurements subject to poor device grounding. Power savings can also be realized by not having to repeat measurements. Additionally, the device can more robustly adapt to various grounding conditions.

The terms "poorly grounded," "ungrounded," "not grounded," "not well grounded," "improperly grounded," "isolated," and "floating" can be used interchangeably to refer to poor grounding conditions that can exist when the touch sensitive device is not making a low resistance electrical connection to ground.

The terms "grounded," "properly grounded," and "well grounded" can be used interchangeably to refer to good grounding conditions that can exist when the touch sensitive device is making a low resistance electrical connection to ground.

Although various embodiments can be described and illustrated herein in terms of touch sensitive devices, it should be understood that the various embodiments are not so limited, but can be additionally applicable to any device for which the device's grounded state can be determined and the device can be selectively adjusted to correct, improve, or otherwise change the device's state, operation, output, and the like.

When a well grounded touch sensitive device receives a touch by an object, such as a user's fingers, the device's mutual signal capacitance Csig at the touch location can be properly changed to produce a pixel touch output value indicative of a true touch event. However, when a poorly grounded touch sensitive device receives a touch by an object, such as a user's fingers, undesirable charge coupling called negative capacitance Cneg can be introduced into the device to cause the pixel touch output value to be in the opposite direction of the intended mutual capacitance change. As such, a pixel experiencing touch under poor grounding conditions can appear to detect less of a touch than is actually present, known as a "negative pixel." Negative pixel compensation can be selectively applied to the negative pixel touch output value to reduce or eliminate the negative pixel effect. However, to be effective, the negative pixel compensation should be applied under appropriate conditions and in appropriate amounts. Since negative capacitance Cneg can be a function of how well the touch sensitive device is grounded, the device's grounded state can be detected so that negative pixel compensation can be applied as needed. The detection can be done by monitoring various touch sensitive device parameters indicative of the device's grounding and determining the grounding based on the monitored parameters' values. FIGS. 1 through 6 illustrate exemplary device parameters and corresponding device components that determine the parameters' values which can be used for detecting a grounded state of a touch sensitive device according to various embodiments.

FIG. 1 illustrates an exemplary touch sensitive device having connector sensors and detectors that can be used for detecting the device's grounded state according to various embodiments. In the example of FIG. 1, touch sensitive device 10 can include touch panel 11, which can receive a touch by an object and produce touch signals (or touch output values) indicative of that touch. The touch sensitive device 10 can also include one or more connector ports 10a, 10b, and 10c for connecting to various components. Connector port 10a can connect the touch sensitive device 10 to power cable 12 (the connection symbolically illustrated by the circle "1"). The power cable 12 can connect to a wall outlet or some other AC power supply to power the device 10. Connector sensor 13a can sense power from the power cable 12 via the connector port 10a. The sensed power can indicate that the device 10 is plugged into a wall outlet, for example, thereby grounding the device through the wall ground. Therefore, sensing power via the connector port 10a can indicate that the touch sensitive device 10 is grounded such that negative pixel compensation can be either deactivated or reduced, if currently active, or can remain inactive otherwise, when the touch panel 11 produces touch signals.

Connector port 10b can connect the touch sensitive device 10 to USB cable 16 (the connection symbolically illustrated by the circle "2"). The USB cable 16 can connect to a USB port of another device, e.g., a computer, to power the touch sensitive device 10 and/or transmit data between the touch sensitive device and the connecting device. Connector sensor 13a can sense the USB connection via the connection port 10b. The sensed connection can indicate that the device 10 is coupled to a computer, for example, thereby grounding the device through the computer ground. Therefore, sensing the connection via the connector port 10b can indicate that the touch sensitive device 10 is grounded such that negative pixel compensation can be either deactivated or reduced, if currently active, or can otherwise remain inactive, when the touch panel 11 produces touch signals.

Connector port 10c can connect the touch sensitive device 10 to connector port 18c of dock 18 (the connection symbolically illustrated by the circle "3"). The dock 18 can in turn connect to either the power cable 12 via dock connector port 18a (the connection symbolically illustrated by the circle "1") or the USB cable 16 via dock connector port 18b (the connection symbolically illustrated by the circle "2"). The touch sensitive device 10 can receive power from the power cable 12 through the dock connections. The touch sensitive device 10 can also receive power and/or data from the USB cable 16 through the dock connections. Resistor pin 13b in the connector port 10c can connect to a resistor of the connecting component, e.g., a resistor of either the power cable 12 or the USB cable 16. When the resistor pin 13b sees a resistance characteristic of the connecting component, the device 10 can identify from that resistance the component, e.g., the cable, to which the device is connected. For example, if the dock 18 is connected to the power cable 12, the resistor pin 13b can identify the characteristic resistance of the power cable and the device 10 can determine that it is connected to the power cable. The device 10 can use the identification (and other information, if needed) to determine its grounded state. For example, the device 10 can identify its connection to the power cable 12 via the resistor pin 13b. Therefore, sensing the resistance via the resistor pin 13b can indicate that the touch sensitive device 10 is grounded via the power cable's connection to a wall outlet or other AC power supply such that negative pixel compensation can be either deactivated or reduced, if currently active, or can otherwise remain inactive when the touch panel 11 produces touch signals. Similar determinations can be made regarding the USB cable's connection between the dock 18 and a computer, for example.

In some embodiments, the dock 18 can include a resistor 18d, such that the resistor pin 13b can sense the dock's characteristic resistance and the device 10 can determine that it is connected to the dock. The device 10 can sense the dock's resistor in cases where neither the power cable 12 nor the USB cable 16 are connected to the dock 18 and therefore to the device. This can be an indication that the device 10 is not connected to a grounded device and therefore is not grounded. As such, negative pixel compensation can be adjusted, if currently active, or activated, if currently inactive, for applying to touch signals.

In some embodiments, the connector port 10c of the touch sensitive device 10 can have additional pins, including a USB pin (not shown) to indicate a connection to the USB cable 16 through the dock 18 and a power pin (not shown) to indicate a connection to the power cable 12 through the dock. When these device pins sense a USB signal or power, the device 10 can determine whether it is sufficiently grounded such that negative pixel compensation can be either deactivated or reduced, if currently active, or can otherwise remain inactive, when the touch panel 11 produces touch signals.

The connector port 10c can also connect the touch sensitive device 10 to adapter cable 14 (the connection symbolically indicated by the circle "3"). The adapter cable 14 can connect to a wall outlet or some other AC power supply to power the device 10. The resistor pin 13b in the connector port 10c can sense the characteristic resistance of the adapter cable 14 and the device 10 can identify that it is connected to the adapter cable. The device 10 can use the identification (and other information, if needed) to determine its grounded state. Sensing the resistance via the resistor pin 13b can indicate that the touch sensitive device 10 is grounded such that negative pixel compensation can be either deactivated or reduced, if currently active, or can otherwise remain inactive, when the touch panel 11 produces touch signals.

In some embodiments, different power cables can result in different grounding conditions for the touch sensitive device. For example, one type of power cable connectable to the device can have three prongs such that the device ground can directly connect to the wall ground, resulting in a well grounded device. As such, negative pixel compensation can be deactivated or reduced, if currently active, or can otherwise remain inactive, when the touch panel produces touch signals. Another type of power cable connectable to the device can have two prongs and a relatively high net capacitance, resulting in a poorly grounded device. As such, negative pixel compensation can be adjusted, if currently active, or activated, if currently inactive, for applying to touch signals. Another type of power cable connectable to the device can have two prongs and a relatively low net capacitance, resulting in a better grounded device. As such, negative pixel compensation can be either deactivated or adjusted as needed, if currently active, or either activated or adjusted as needed, if currently inactive, for applying to touch signals.

Additional and/or other connecting components and combinations can be used to determine a grounded state of the touch sensitive device according to various embodiments.

Figure 2:
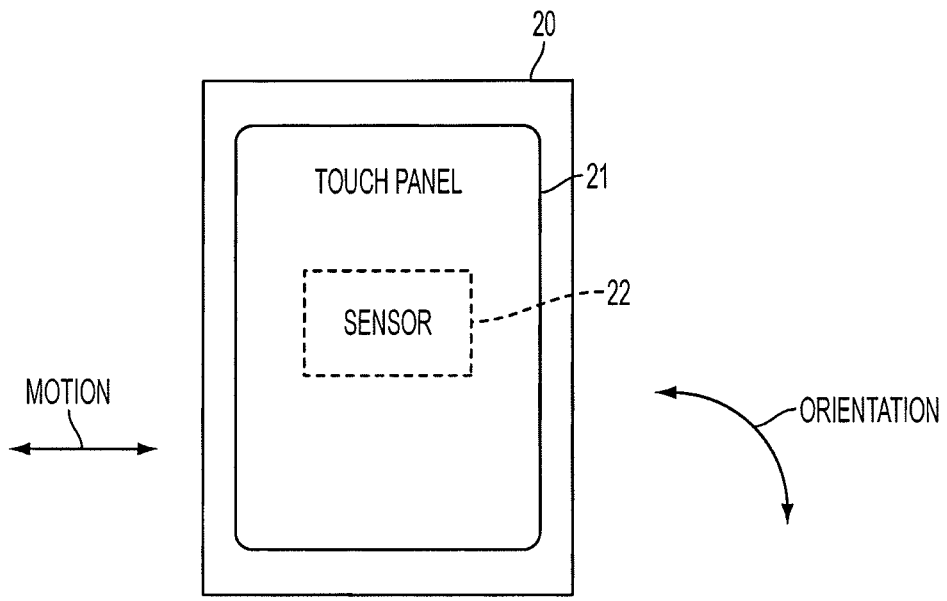
FIG. 2 illustrates an exemplary touch sensitive device having a motion sensor that can be used for detecting a grounded state of the device according to various embodiments.

FIG. 2 illustrates an exemplary touch sensitive device having motion sensors that can be used for detecting the device's grounded state according to various embodiments. In the example of FIG. 2, touch sensitive device 20 can include touch panel 21, which can receive a touch and produce touch signals indicative of the touch. The touch sensitive device 20 can also include motion sensor 22 to sense the device's orientation and motion. Example motion sensors can include accelerometers, gyroscopes, and the like. Sensing the orientation and motion of the device 20 can give an indication of the device's current status, which can be indicative of the device's grounded state. For example, if the motion sensor 22 of the device 20 senses a particular pattern, frequency, and/or magnitude of vibrations unique to humans, the device can determine that it is in contact with a user, e.g., being held, and therefore grounded. These patterns, frequencies, and/or magnitudes can be predetermined or can be "learned" if the user places the device into a learning state while holding, moving, or walking with the device, for example. As such, negative pixel compensation can be deactivated or reduced, if currently active, or can otherwise remain inactive, when the touch panel 21 produces touch signals. If the motion sensor 22 senses motion that is determined not to be human vibrations, the device 20 can use additional information about the object moving the device to determine whether the device is grounded. Conversely, if the motion sensor 22 senses that the device 20 is substantially stationary and/or oriented in a particular manner, the device can determine that it is in a dock or on a surface. If in a dock, the device 20 can use additional information, e.g., the dock connections, to determine whether the device is grounded. If on a surface, the device 20 can use additional information, e.g., the device connections or the surface, to determine whether the device is grounded. The device 20 can selectively apply negative pixel compensation to the touch signals based on the determination.

Figure 3:
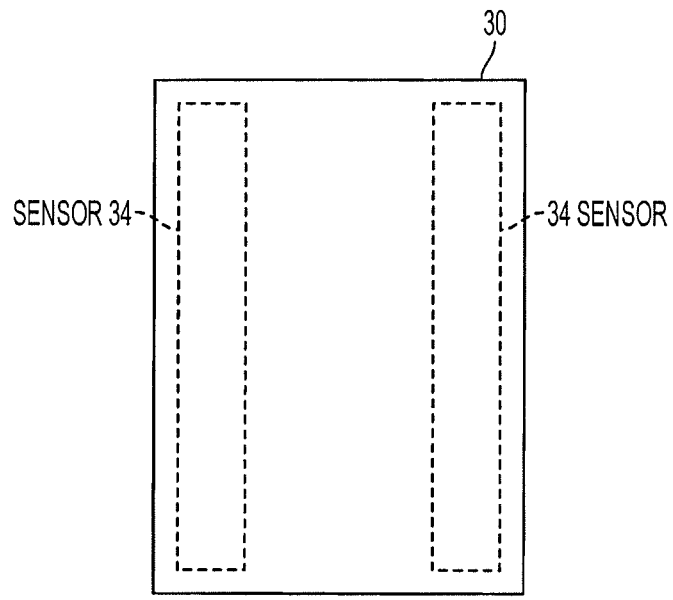
FIG. 3 illustrates an exemplary touch sensitive device having a proximity sensor that can be used for detecting a grounded state of the device according to various embodiments.

FIG. 3 illustrates an exemplary touch sensitive device having proximity sensors that can be used for detecting the device's grounded state according to various embodiments. In the example of FIG. 3, touch sensitive device 30 can include proximity sensors 34 for sensing surfaces proximate to the device. The touch sensitive device 30 can also include a touch panel (not shown) for receiving a touch and producing touch signals indicative of the touch. In some embodiments, the proximity sensors 34 can be disposed at a back surface of the touch sensitive device 30 (as shown in FIG. 3) to sense the surface proximate to the back of the device or that the device rests against. In some embodiments, the proximity sensors 34 can be disposed at a side surface of the touch sensitive device 30 to sense the surface proximate to the sides of the device or that the device rests against. In some embodiments, the proximity sensors 34 can be disposed at a front surface of the touch sensitive device 30 to sense the surface proximate to the front of the device or that the device rests against. In some embodiments, the proximity sensors 34 can be disposed at multiple locations of the device, including the back, the sides, the front, and so on. Example proximity sensors can include capacitive, infrared, optical, ultrasound, etc., sensors.

Sensing a surface proximate to the touch sensitive device 30 can identify the type of surface, e.g., wood, metal, plastic, organic, inorganic, human, and so on. For example, sensing a proximate human surface can be an indication that the device 30 is being held by a user or resting in the user's lap and therefore grounded. As such, negative pixel compensation can be deactivated or reduced, if currently active, or can otherwise remain inactive. Sensing a proximate wood surface can be an indication that the device 30 is resting on a table top and therefore likely poorly grounded. As such, negative pixel compensation can be adjusted, if currently active, or activated, if currently inactive, to apply to touch signals from the touch panel. Sensing a rubber surface can be an indication that the device 30 is in a protective case and therefore likely poorly grounded, even if held by the user since the rubber can act as an insulator. As such, negative pixel compensation can be adjusted, if currently active, or activated, if currently inactive, to apply to touch signals. In some embodiments, when a surface is proximate to the device 30, the proximity sensor 34 can sense a capacitance of the object having the proximate surface. Based on the sensed capacitance, the device 30 can identify the proximate surface.

In some embodiments, other property sensors can be used to sense one or more identifying physical properties of the surface. Example properties can include temperature, texture, refractivity, conductivity, permeability (ability of material to respond to a magnetic field), density, and the like. For example, a density sensor can sense a density of an object in the volume of space near the device 30, a temperature sensor can sense a temperature of an object proximate to the device, and so on. Values of properties for various surfaces can be stored in memory and compared to the sensed properties to identify the proximate surface, for example. Based on the identified proximate surface, the device can determine its grounded state and whether negative pixel compensation should be applied.

In some embodiments, other sensors can be used in conjunction with the proximity sensors 34 to detect the grounded state of the touch sensitive device 30. For example, the proximity sensors 34 can be used in conjunction with the motion sensors of FIG. 2 to determine whether the touch sensitive device 30 is laying flat on a surface and what type of surface and, from at least this information, determine the device's grounded state. Based on this determination, the device 30 can selectively apply negative pixel compensation to the touch signals.

Figure 4:
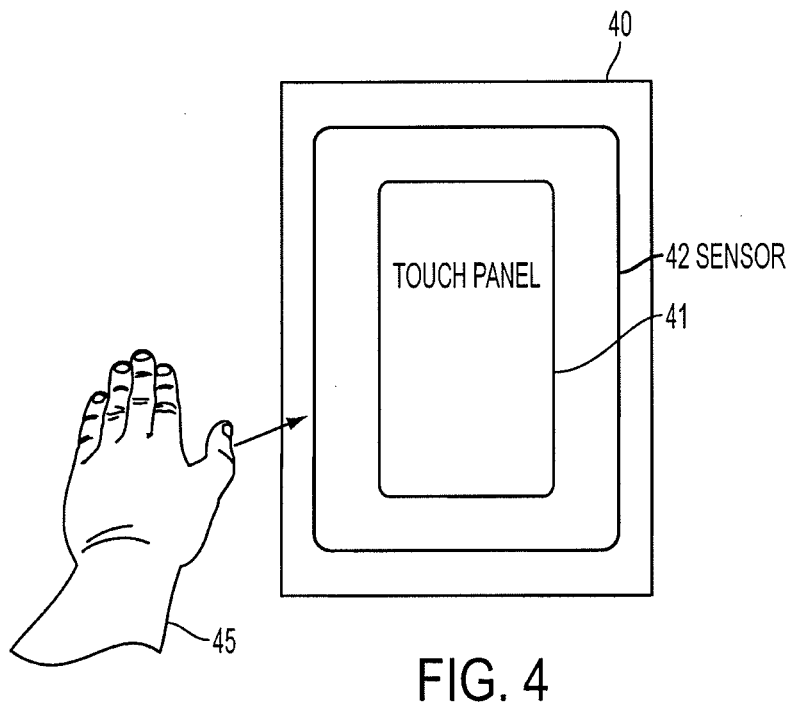
FIG. 4 illustrates an exemplary touch sensitive device having a perimeter sensor that can be used for detecting a grounded state of the device according to various embodiments.

FIG. 4 illustrates an exemplary touch sensitive device having perimeter sensors that can be used for detecting the device's grounded state according to various embodiments. In the example of FIG. 4, touch sensitive device 40 can include touch panel 41 to receive a touch and produce touch signals indicative of the touch. The touch sensitive device 40 can also include sensor 42 around the perimeter of the device for sensing a user's hand 45 or other object touching or holding the device. The sensor 42 can be around the perimeter because a user is likely to touch the perimeter of the touch sensitive device 40 as the user holds the device. However, it is to be understood that the location of the sensor is not limited to the perimeter, but can be disposed anywhere on the device that a user is likely to touch or hold.

In some embodiments, the sensor 42 can be a capacitive sensor to sense a touch at the device 40. The capacitive sensor can be a self capacitance sensor, in which a conductive electrode disposed around a perimeter of the touch sensitive device 40 can be charged to generate fringing electric fields around the perimeter edges and form a self capacitance with respect to ground. A grounded object, e.g., a user's hand, can capacitively couple with the electrode as the object touches the device, thereby adding to the self capacitance. The increase in the self capacitance of the electrode can be measured by the device 40 to determine whether the object is touching the device. In addition or alternative to a signal charging the perimeter electrode, a signal can be applied to all or portions of the touch sensitive device 40 and associated electronics to generate electric fields between the device and a ground electrode, thereby forming a self capacitance with respect to ground.

In some embodiments, the capacitive sensor can be a mutual capacitance sensor, in which a pair of conductive electrodes can be disposed in close proximity to each other around a perimeter of the touch sensitive device 40 and in which one of the electrodes can be charged (e.g., stimulated with an AC voltage) to form fringing electric fields and a mutual capacitance therebetween. A grounded object, e.g., a user's hand, can capacitively couple with the charged electrode as the object touches the device, thereby stealing charge away from the charged electrode and reducing the mutual capacitance. The reduction in the mutual capacitance can be measured by the device 40 to determine whether the object is touching the device. The sensor 42 can sense a touch or hold on the front, the back, and/or the sides of the device 40.

Sensing a touch on the device 40 can be an indication that the device is being held and therefore grounded. As such, negative pixel compensation can be deactivated or reduced, if currently active, or can otherwise remain inactive, when the touch panel 41 produces touch signals.

In some embodiments, multiple electrodes (in self capacitance embodiments) or multiple pairs of electrodes (in mutual capacitance embodiments) can be used rather than a single continuous electrode or a single pair of continuous electrodes. The multiple electrodes can be disposed single file around a perimeter of the touch sensitive device with small spaces between consecutive electrodes. In addition to the device determining that a user has touched the device based on sensed signals from the electrodes, the device can determine the location of the touch based on which electrodes transmitted the sensed signals. Similarly, in some embodiments, a segmented electrode or a segmented pair of electrodes can be used rather than the single continuous electrode or the single pair of continuous electrodes.

In some embodiments, the touch sensitive device can include a pair of shielding electrodes disposed along both sides of the perimeter sensor (electrode or electrode pair) around the perimeter of the device. The shielding electrodes can be used to isolate the capacitive coupling at the sensor location of the device and minimize parasitic cross coupling, thereby improving the sensing of a touch at the other locations of the device. For example, the perimeter sensor can be located on the front surface of the device with the shielding electrodes around the sensor so that capacitive coupling and touch sensing at the back surface of the device can be improved. Improved touch sensing at the back surface can be useful for instances when a user is more likely to contact the back of the device than the front, e.g., when the user cradles or cups the device in the user's hands.

As shown in FIG. 4, the perimeter sensor can be on the front of the device. In some embodiments, the perimeter sensor can be on the sides of the device. In some embodiments, the perimeter sensor can be on the back of the device. In some embodiments, the perimeter sensor can be on combinations of the front, the sides, and the back depending on the needs of the device.

Figure 5:
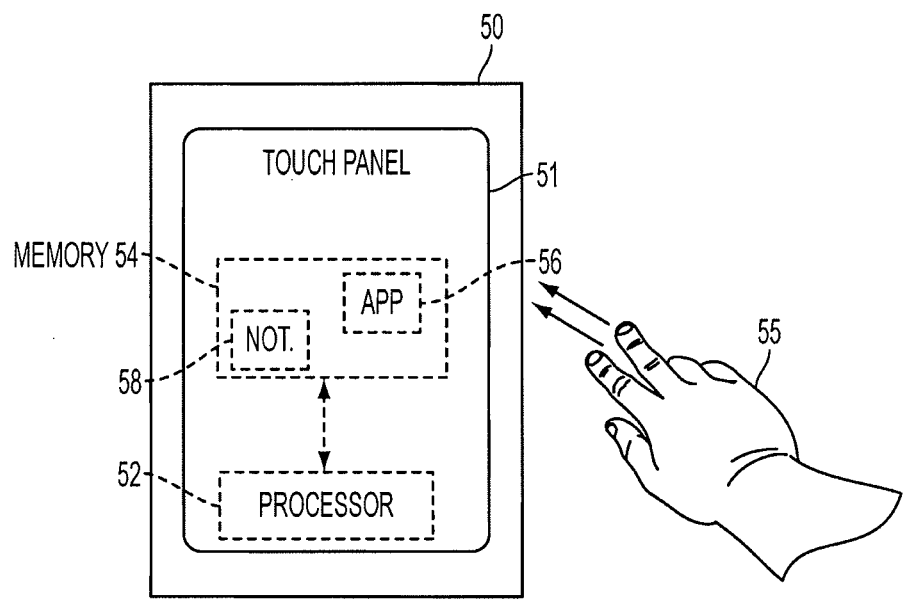
FIG. 5 illustrates an exemplary touch sensitive device having a notification algorithm that can be used for detecting a grounded state of the device according to various embodiments.

FIG. 5 illustrates an exemplary touch sensitive device having a notification algorithm that can be used for detecting a grounded state of the device according to various embodiments. In the example of FIG. 5, touch sensitive device 50 can include touch panel 51, which can receive a touch and produce touch signals indicative of the touch. The touch sensitive device 50 can also include processor 52 and memory 54. The memory 54 can store various applications 56 that can be executed by the processor 52 to operate on the device 50. The memory 54 can also store notification algorithms 58 that can also be executed by the processor 52 to issue a notice when an application 56 is executed that could be affected by the device 50 being poorly grounded. For example, an application 56 that requires a user to touch the device 50 with multiple fingers 55 at the same time can cause the negative pixel effect, as described previously. As such, negative pixel compensation can be applied to the multiple-finger touch signals produced by the touch panel 51 when that application executes. Conversely, negative pixel compensation can be omitted when an application 56 that requires the user to touch the device 50 with only one finger executes.

In some embodiments, a notification algorithm can monitor the application log or other processing data and issue a notice when a multiple finger application executes. The notice can trigger the negative pixel compensation to be applied. In some embodiments, a multiple finger application can send a message to the notification algorithm that it is running, causing the notification algorithm to issue a notice and trigger the application of negative pixel compensation. In some embodiments, the notification algorithm can be incorporated into the application. In some embodiments, the notification algorithm can be separate and in communication with the application.

Example applications that can require multiple finger touches on the touch sensitive device can include a virtual keyboard display, a multiple finger gesture input, and the like.

It is to be understood however that not only multiple finger applications, but other applications and/or operating conditions of the device can be affected by a poorly grounded device, causing the notification algorithm to issue a notice upon execution of those applications and/or detection of those conditions.

Figure 6:
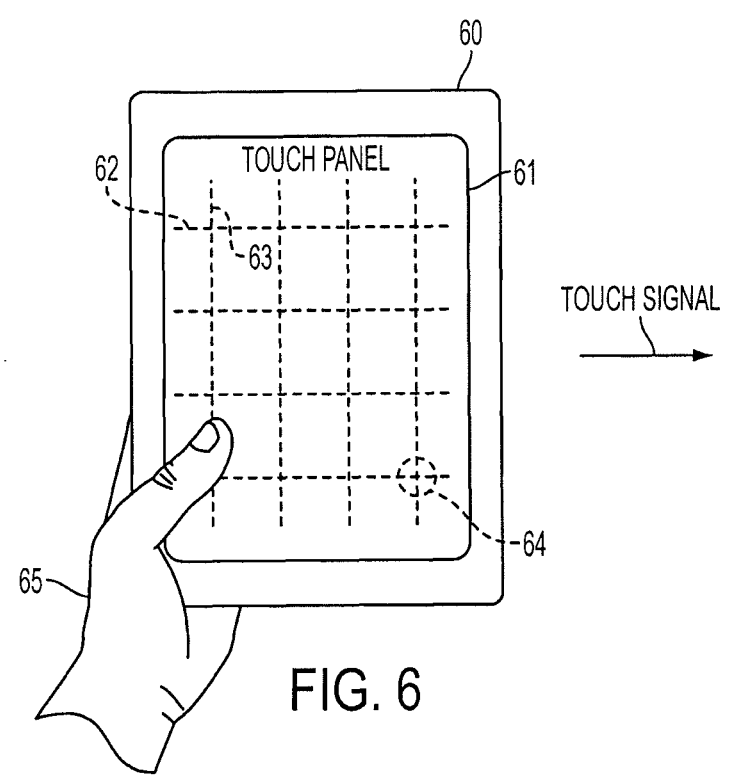
FIG. 6 illustrates an exemplary touch sensitive device having a touch sensor panel that can be used for detecting a grounded state of the device according to various embodiments.

FIG. 6 illustrates an exemplary touch sensitive device having a touch sensor panel that can be used for detecting a grounded state of the device according to various embodiments. In the example of FIG. 6, touch sensitive device 60 can include touch sensor panel 61 for sensing a touch at the device. The touch sensor panel 61 can include multiple rows of drive lines 62 and multiple columns of sense lines 63 with the intersections of the drive and sense lines forming touch pixels 64. When the drive lines are charged, they can capacitively couple with the sense lines to provide mutual capacitance (similar to that described previously) and the sense lines can transmit a touch signal indicative of a touch at the panel 61 to sensing circuitry (not shown). The touch signals can be analyzed to determine the characteristics of the touch, including the location, orientation, shape, movement, and so on, of the touch image generated by the touch. For example, a user's finger tip touching the panel can produce a circular touch image. Multiple finger tips can produce multiple circular touch images adjacent to each other. A thumb can produce an oval touch image, which can be vertical, horizontal, or angular, depending on the orientation of the thumb when touching the panel.

A user's grip of an item can typically pose the thumb at an angle on a front surface of the item with the fingers either on or encircling the back surface of the item. In the case of the touch sensitive device 60, a user's grip 65 can pose the thumb at an angle on the front of the device at a lower corner. Consistently, the touch image of the thumb produced by the touch panel 61 can have an oval shape at a lower corner of the image with an angular orientation.

Accordingly, sensing a touch image having this thumb configuration can be an indication that the touch sensitive device is being held and therefore grounded. As such, negative pixel compensation can be deactivated or reduced, if currently active, or can otherwise remain inactive, when the touch panel 61 generates a touch signal.

It is to be understood that the embodiments and parameters described in FIGS. 1 through 6 can be used individually or in various combinations to detect the grounded state of a touch sensitive device. It is further to be understood that the embodiments and parameters are not limited to those described herein, but can include additional and/or other embodiments and parameters capable of being used for detecting the device's grounded state.

Figure 7:
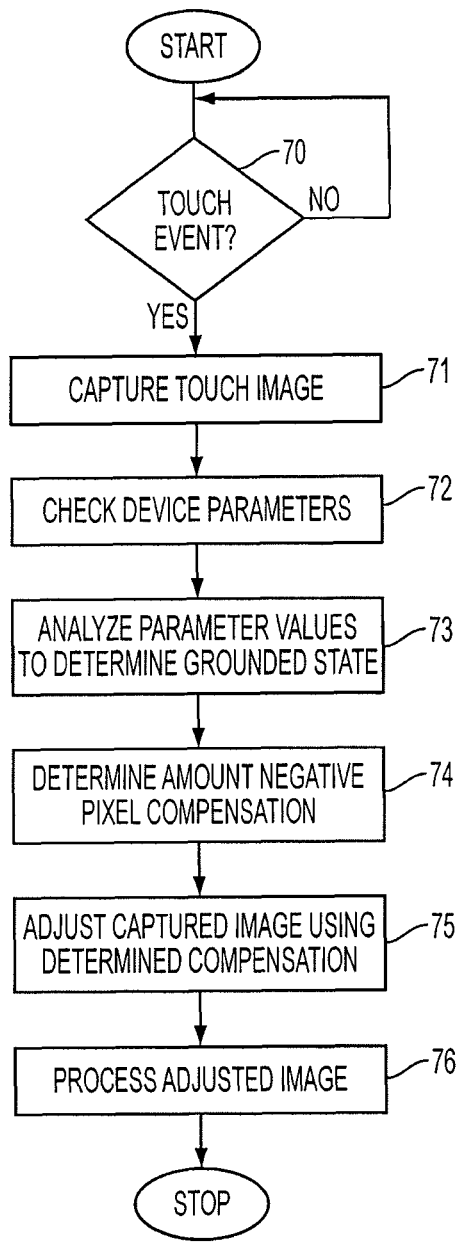
FIG. 7 illustrates an exemplary method for detecting a grounded state of a touch sensitive device according to various embodiments.

FIG. 7 illustrates an exemplary method for detecting a grounded state of a touch sensitive device according to various embodiments. In the example of FIG. 7, a determination can be made whether a touch event has occurred at a touch sensitive device (70). If so, a touch image of the touch event can be captured by the device (71). Various parameters of the device can be checked (72). For example, the parameters as described in FIGS. 1 through 6 can be checked. The parameters' values can be analyzed to determine the grounded state of the device (73).

In some embodiments, the parameters' values can be binary, e.g., "state 1" or "state 2," "1" or "0," "on" or "off," "yes" or "no," and so on. For example, the power connector values can be "yes" if the power cable is plugged into the wall and "no" if the power cable is either not plugged into the wall or not connected to the device.

In some embodiments, a single parameter value can be used to determine that the device is grounded. For example, a power value indicating that the device is plugged into the wall can determine that the device is grounded. In that case, other parameters' values can be discarded or otherwise ignored in the analysis. In some embodiments, multiple parameter values can be used to determine that the device is grounded. For example, a motion value indicating that the device is lying stationary and flat, a proximity value indicating that the device is lying on a wood table top, and a power value indicating that the device is not plugged into the wall can determine that the device is not properly grounded. In such instances, other parameters' values can be discarded or otherwise ignored in the analysis. In some embodiments, the parameter values can be weighted and the mathematical result (e.g., sum, product, ratio, etc.) of the weighted values can indicate the grounded state, where parameters which are stronger or more determinative indicators of the device's grounded state can have higher weights and parameters which are weaker or inconclusive indicators of the grounded state can have lower weights. The mathematical result can be a particular one of multiple possible values, e.g., an analog value, indicating the degree of grounding, or can be compared to a threshold, indicating "grounded" above the threshold and "not grounded" below the threshold. In some embodiments, a lookup table can be used to determine whether the device is grounded, where each entry of the lookup table can include a permutation of the possible parameters' values and a grounded state based on that permutation.

In some embodiments, the grounded state can be a binary value, e.g., grounded can be "yes" and not grounded can be "no." In some embodiments, the grounded state can be a particular one of multiple possible values, e.g. an analog value, indicating the degree of grounding, e.g., ranging from grounded at 1.0 to not grounded at 0.0.

The following depict exemplary scenarios in which parameters of a touch sensitive device can be used to detect whether the device is grounded. In one example scenario, if the device is in a dock and plugged into the wall, a connector sensor in the device can sense that the power cable is plugged in to determine that the device is grounded. In another example scenario, if the device is held in a user's hand, a motion sensor can sense the signature human vibration and the perimeter sensor can sense the user's touch at the device to determine that the device is grounded. In another example scenario, if the device is in a dock and untouched, none of the parameters' values can likely provide information that can determine whether the device is grounded. For example, the motion sensor can sense an upright pose of the device and the proximity sensor can perhaps sense the dock being proximate to the device, but neither may be sufficient to determine the grounded state, depending on the device. In this instance, a default determination can be made, e.g., that the device is not grounded. In one example scenario, if the device is in a dock and being touched, the perimeter sensor can sense the user's touch at the device. However, the user may not be touching enough of the device to fully ground the device, which can result in a false positive determination that the device is grounded. As such, the absence of other parameters, e.g., an indication from the connector sensor that the power cable is plugged in, can be used to determine, despite the perimeter sensor value, that the device is either not or just partially grounded. In another example scenario, if the device is in a user's lap, the motion sensor can sense the signature human vibration and the proximity sensor can sense the user's lap under the device such that it can be determined that the device is grounded. In another example scenario, if the device is in a protective cover, the proximity sensor can sense the cover material such that it can be determined that the device is not grounded.

Based on the determined grounded state of the device, a determination can be made whether to selectively apply negative pixel compensation and how much, e.g., fully, partially, or not at all (74). If the determined grounded state is well grounded, negative pixel compensation can be deactivated or reduced, if currently active, or can otherwise remain inactive. If the determined grounded state is anything else, negative pixel compensation can be adjusted, if currently active, or activated, if currently inactive. In terms of how much to apply, in some embodiments where the grounded state is a binary value, the amount of negative pixel compensation can also be a binary value, e.g., if the grounded state is "yes," the negative pixel compensation can be omitted or not applied at all, and if the grounded state is "no," the negative pixel compensation can be applied fully.

In some embodiments where the grounded state can have one of multiple values, e.g. an analog value, the amount of negative pixel compensation to be applied can be scaled either up or down based on the extent that the device is grounded, i.e., based on the grounded value. For example, if the degree of grounding is 0.8, indicative of some grounding, the amount of negative pixel compensation can be decreased by 80% from a predetermined full amount, since less negative pixel effect is likely. Conversely, if the degree of grounding is determined to be 0.2, indicative of some, but not a significant amount of grounding, the amount of negative pixel compensation can be decreased by only 20% from the full amount, since a significant negative pixel effect is likely. As such, the amount of negative pixel compensation to be applied can be proportionate to the extent of the device grounding.

In some embodiments, the negative pixel compensation can be calculated. In some embodiments, the negative pixel compensation can be predetermined, e.g., accessed from a lookup table.

The determined negative pixel compensation can be applied to the touch image to adjust the touch signals, thereby reducing or eliminating any negative pixel effects and providing more accurate touch signals (75). The adjusted touch image can be further processed to get touch information for use by the device (76).

This method can be repeated each time a touch event occurs at the device. Alternatively, this method can be repeated periodically between multiple touch events, depending on the needs of the device.

Figure 8:
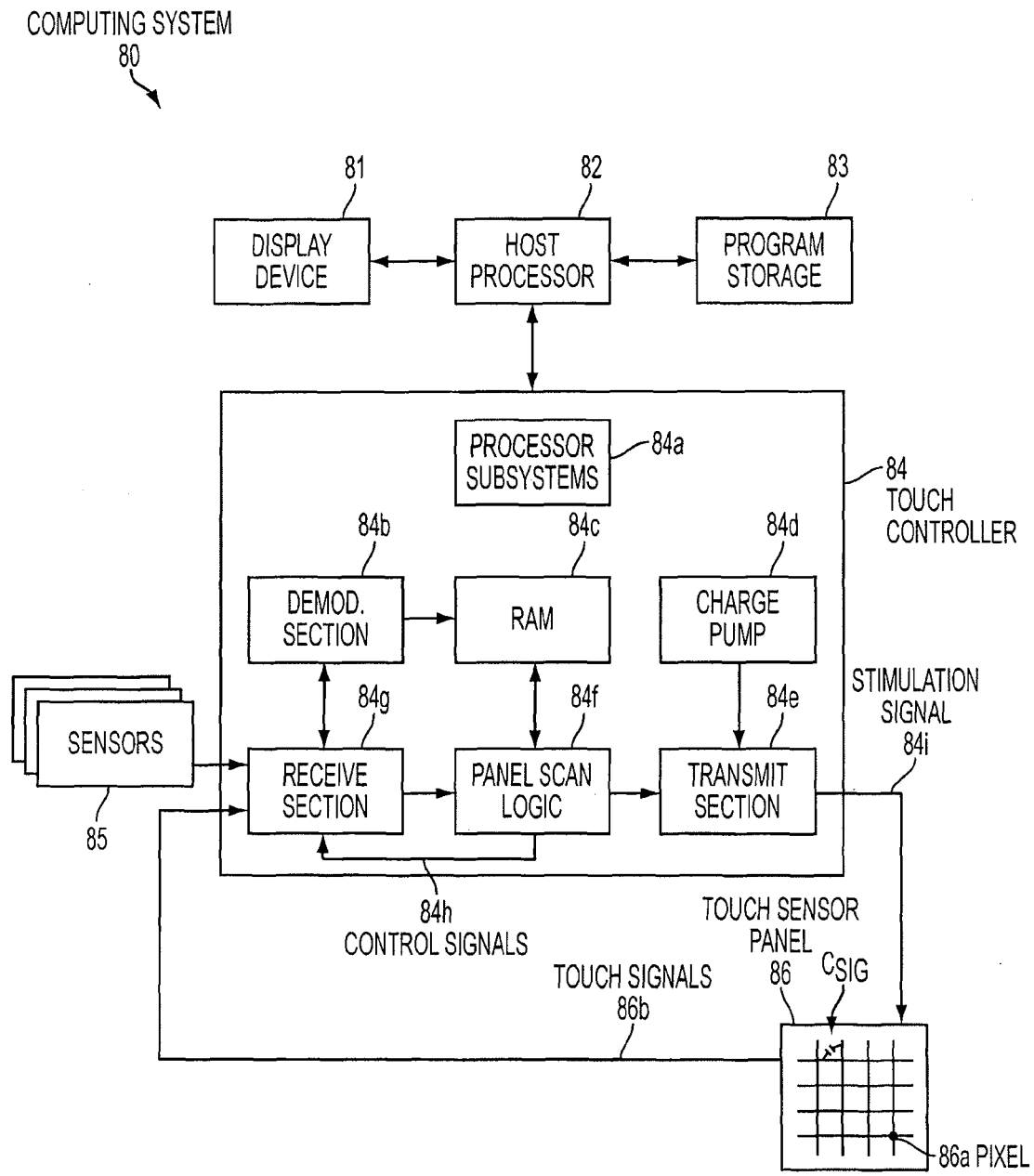
FIG. 8 illustrates an exemplary computing system of a touch sensitive device that can detect a grounded state of the device according to various embodiments.

FIG. 8 illustrates an exemplary computing system 80 of a touch sensitive device that can detect a grounded state of the device according to various embodiments described herein. In the example of FIG. 8, computing system 80 can include touch controller 84. The touch controller 84 can be a single application specific integrated circuit (ASIC) that can include one or more processor subsystems 84a, which can include one or more main processors, such as ARM968 processors or other processors with similar functionality and capabilities. However, in other embodiments, the processor functionality can be implemented instead by dedicated logic, such as a state machine. The processor subsystems 84a can also include peripherals (not shown) such as random access memory (RAM) or other types of memory or storage, watchdog timers and the like. The touch controller 84 can also include receive section 84g for receiving signals, such as touch signals 86b of one or more sense channels (not shown), other signals from other sensors such as sensor 85, as described above in FIGS. 1 through 6, for example. The touch controller 84 can also include demodulation section 84b such as a multistage vector demodulation engine, panel scan logic 84f, and transmit section 84e for transmitting stimulation signals 84i to touch sensor panel 86 to drive the panel. The panel scan logic 84f can access RAM 84c, autonomously read data from the sense channels, and provide control for the sense channels. In addition, the panel scan logic 84f can control the transmit section 84e to generate the stimulation signals 84i at various frequencies and phases that can be selectively applied to rows of the touch sensor panel 86.

The touch controller 84 can also include charge pump 84d, which can be used to generate the supply voltage for the transmit section 84e. The stimulation signals 84i can have amplitudes higher than the maximum voltage by cascading two charge store devices, e.g., capacitors, together to form the charge pump 84d. Therefore, the stimulus voltage can be higher (e.g., 6V) than the voltage level a single capacitor can handle (e.g., 3.6 V). Although FIG. 8 shows the charge pump 84d separate from the transmit section 84e, the charge pump can be part of the transmit section.

Touch sensor panel 86 can include a capacitive sensing medium having row traces (e.g., drive lines) and column traces (e.g., sense lines), although other sensing media can also be used. The row and column traces can be formed from a transparent conductive medium such as Indium Tin Oxide (ITO) or Antimony Tin Oxide (ATO), although other transparent and non-transparent materials such as copper can also be used. In some embodiments, the row and column traces can be perpendicular to each other, although in other embodiments other non-Cartesian orientations are possible. For example, in a polar coordinate system, the sense lines can be concentric circles and the drive lines can be radially extending lines (or vice versa). It should be understood, therefore, that the terms "row" and "column" as used herein are intended to encompass not only orthogonal grids, but the intersecting traces of other geometric configurations having first and second dimensions (e.g. the concentric and radial lines of a polar-coordinate arrangement). The rows and columns can be formed on, for example, a single side of a substantially transparent substrate separated by a substantially transparent dielectric material, on opposite sides of the substrate, on two separate substrates separated by the dielectric material, etc.

At the "intersections" of the traces, where the traces, pass above and below (cross) each other (but do not make direct electrical contact with each other), the traces can essentially form two electrodes (although more than two traces can intersect as well). Each intersection of row and column traces can represent a capacitive sensing node and can be viewed as picture element (pixel) 86a, which can be particularly useful when the touch sensor panel 86 is viewed as capturing an "image" of touch. (In other words, after the touch controller 84 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between row and column electrodes can appear as a stray capacitance Cstray when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the pixels being touched, which can be a function of Csig.

Computing system 80 can also include host processor 82 for receiving outputs from the processor subsystems 84a and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. The host processor 82 can also perform additional functions that may not be related to panel processing, and can be coupled to program storage 83 and display device 81 such as an LCD display for providing a UI to a user of the device. In some embodiments, the host processor 82 can be a separate component from the touch controller 84, as shown. In other embodiments, the host processor 82 can be included as part of the touch controller 84. In still other embodiments, the functions of the host processor 82 can be performed by the processor subsystem 84a and/or distributed among other components of the touch controller 84. The display device 81 together with the touch sensor panel 86, when located partially or entirely under the touch sensor panel or when integrated with the touch sensor panel, can form a touch sensitive device such as a touch screen.

A grounded state of the touch sensitive device can be determined by the processor in subsystem 84a, the host processor 82, dedicated logic such as a state machine, or any combination thereof based on inputs from the sensors 85 and other information, according to various embodiments.

Note that one or more of the functions described above can be performed, for example, by firmware stored in memory (e.g., one of the peripherals) and executed by the processor subsystem 84a, or stored in the program storage 83 and executed by the host processor 82. The firmware can also be stored and/or transported within any computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the touch sensor panel is not limited to touch, as described in FIG. 8, but can be a proximity panel or any other panel according to various embodiments. In addition, the touch sensor panel described herein can be either a single-touch or a multi-touch sensor panel.

It is further to be understood that the computing system is not limited to the components and configuration of FIG. 8, but can include other and/or additional components in various configurations capable of detecting the device's grounded state according to various embodiments.

Figure 9:
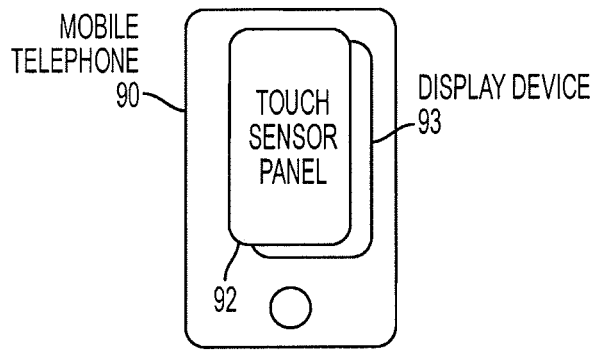
FIG. 9 illustrates an exemplary mobile telephone that can detect its grounded state according to various embodiments.

FIG. 9 illustrates an exemplary mobile telephone 90 that can include touch sensor panel 92, display 93, and other computing system blocks that can detect the telephone's grounded state according to various embodiments.

Figure 10:
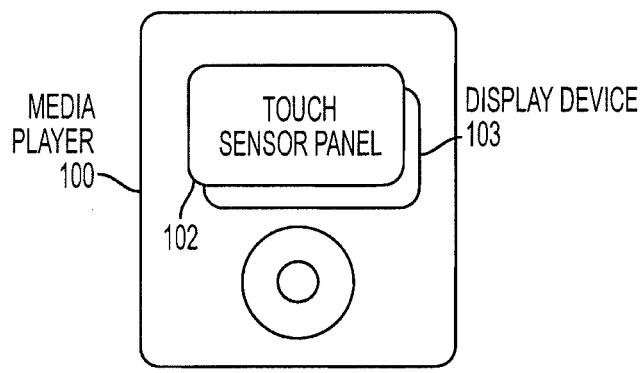
FIG. 10 illustrates an exemplary digital media player that can detect its grounded state according to various embodiments.

FIG. 10 illustrates an exemplary digital media player 100 that can include touch sensor panel 102, display 103, and other computing system blocks that can detect the player's grounded state according to various embodiments.

Figure 11:
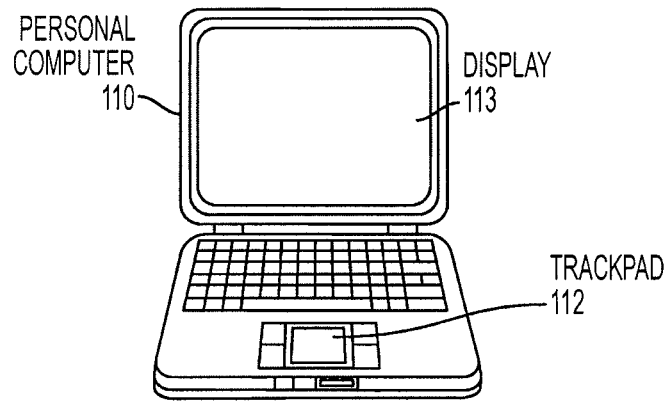
FIG. 11 illustrates an exemplary personal computer that can detect its grounded state according to various embodiments.

FIG. 11 illustrates an exemplary personal computer 110 that can include touch sensor panel (trackpad) 112, display 113, and other computing system blocks that can detect the computer's grounded state according to various embodiments.

The mobile telephone, media player, and personal computer of FIGS. 9 through 11 can realize power savings, improved accuracy, faster speed, and more robustness by detecting their grounded states according to various embodiments.

Although parameters of the touch sensitive device are described herein as being used to detect the grounded state of the device, it is to be understood that these and/or other parameters can bemused for other purposes associated with the device. For example, parameters can be used to adjust the radiation output of the device to reduce radiation exposure during usage. Parameters can also be used to adjust the operation of the device to reduce power or other components based on the current usage of the device.

To adjust the radiation output, parameters of the touch sensitive device can be checked to determine the orientation of the device and the proximity of the device to the user. The parameters' values can be analyzed to determine whether the device is currently being held upright next to the user, e.g., whether the user is making a call on the device and is holding the device upright against an ear or at the mouth. For example, a motion sensor output as previously described can indicate the device's orientation and motion, a proximity sensor output as previously described can indicate whether the device is proximate to a user, a perimeter sensor output as previously described can indicate whether the device is being held, a touch sensor panel output as previously described can also indicate whether the device is being held, a notification algorithm as previously described can indicate whether the device is currently executing a telephone application, a connection output as previously described can indicate whether the device is plugged in, and so on. If the device is determined to be held upright next to the user, the radiation output of the device can be adjusted, e.g., reduced, to limit the user's radiation exposure. The parameters' values can be either continuously or periodically checked and analyzed such that when the user moves the device to a flat position or away from the user, the radiation output of the device can be adjusted again, e.g., returned to its initial output.

To adjust the usage of the device, parameters of the touch sensitive device can be checked to determine how the device is currently being used, e.g., whether the device is currently in a holster carried by a user, at a location away from the user, or in the user's hand. For example, a motion sensor output as previously described can indicate the device's orientation and motion, a proximity sensor output as previously described can indicate whether the device is proximate to a user or an object, a perimeter sensor output as previously described can indicate whether the device is being held, a touch sensor panel output as previously described can also indicate whether the device is being held, a notification algorithm as previously described can indicate whether the device is currently executing an application or is idle, a connection output as previously described can indicate whether the device is plugged in, and so on. If the device is determined to be at a location away from the user, the ring tone can be increased so that the user can more easily hear a ring indicating an incoming call. If the device is determined to be in the holster, the ring tone can be switched to vibration mode so that the user can feel a vibration indicating an incoming call. If the device is determined to be in the user's hand, the ring tone can be decreased or deactivated since the device is likely in use. In addition or alternatively, if the device is in the holster or in a location away from the user, the power consumption can be reduced to conserve power since the holster or the away location can be indicative of idle time or non-usage. The parameters' values can be either continuously or periodically checked and analyzed for change in use.

Figure 12:
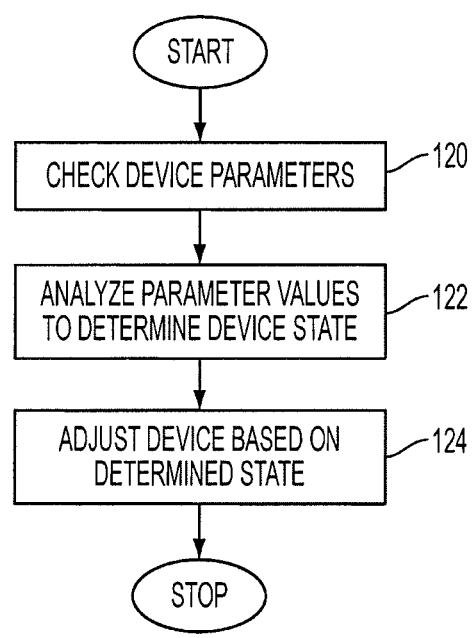
FIG. 12 illustrates an exemplary method for detecting a state of a touch sensitive device according to various embodiments.

FIG. 12 illustrates an exemplary method for detecting a state of a touch sensitive device according to various embodiments. In the example of FIG. 12, parameters of the touch sensitive device can be checked (120). The parameters' values can be analyzed to determine the state of the device (122). For example, the parameters can be analyzed to determine whether the device is upright proximate to a user or whether the device is in a holster or a hand, as described previously. Based on the analysis, the device can be adjusted (124). For example, the device's outputs and/or operation can be adjusted.

It is to be understood that the method is not limited to a touch sensitive device, but can be applied to other portable devices, as well as stationary devices, for which a grounded state (or any other state) can be detected.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A touch sensitive device comprising:
 at least one device component configured to provide an output indicative of a state of the device, the at least one device component including a motion sensor or a proximity sensor;
 a touch sensing component configured to sense a touch at the device and to output one or more touch signals associated with the sensed touch; and
 a processor configured to
  determine a grounding condition of the device based on at least one of the output of the motion sensor or proximity sensor, and
  apply a function selectively to compensate one or more touch signals having a negative touch output value when the grounding condition is indicative of negative capacitance introduced into the device.

2. The device of claim 1, wherein the device component is at least one of a connector sensor configured to sense a component connection to the device, a resistor detector configured to detect a resistor connection to the device, a motion sensor configured to sense at least one of motion or orientation of the device, a proximity sensor configured to sense a surface proximate to the device, a perimeter sensor configured to sense an object in contact with a perimeter of the device, a property sensor configured to sense a property of an object proximate to the device, or an application indicator configured to indicate what type of application the device executes.

3. The device of claim 2, wherein the processor is configured to determine the grounding condition of the device based on at least one of the component connection, the resistor connection, the device motion, the device orientation, the proximate surface, the perimeter contact, or the executed application.

4. The device of claim 1, wherein the touch sensing component is configured to determine the portion of an object touching the device according to the touch signal.

5. The device of claim 4, wherein the processor is configured to determine the grounding condition of the device based on the determined touching portion of the object.

6. The device of claim 1, wherein the function reduces an error introduced into the one or more touch signals when the device is poorly grounded.

7. The device of claim 1, wherein the processor is configured not to apply the function when the grounding condition is not indicative of negative capacitance introduced into the device.

8. The device of claim 1 incorporated into at least one of a mobile telephone, a digital media player, or a personal computer.

9. A method comprising:
 capturing one or more touch signals indicative of a touch at a touch sensitive device;
 providing, with one or more device components including a motion sensor or a proximity sensor, an output indicative of at least one parameter value associated with a status of the device;
 determining a grounding condition of the device based on the output of the motion sensor or the proximity sensor; and
 applying a function selectively to compensate the one or more touch signals having a negative touch output value when the grounding condition is indicative of negative capacitance introduced into the device.

10. The method of claim 9, wherein providing the parameter value comprises providing information corresponding to at least one of whether the device is plugged into a wall outlet, whether the device is coupled to a grounded device, or whether the device is in physical contact with a user.

11. The method of claim 9, wherein determining the grounding condition comprises determining whether the parameter value is indicative of a grounded state of the device.

12. The method of claim 9, wherein determining the amount of adjustment comprises determining that no adjustment is required when the grounding condition is not indicative of negative capacitance introduced into the device.

13. The method of claim 9, wherein determining the amount of adjustment comprises determining the extent to which negative capacitance is introduced into the device and scaling an adjustment amount of compensation proportionate to the determined extent.

14. The method of claim 9, comprising adjusting the one or more touch signals using the determined amount of compensation.

15. A touch sensitive device comprising:
  one or more input components including a motion sensor or a proximity sensor;
  a touch sensor panel comprising multiple touch nodes, each touch node configured to output a touch signal indicative of a touch event at the device; and
  a processor configured to
    analyze one or more inputs from the input components,
    determine a grounding condition of the device based on the analyzed inputs of the motion sensor or the proximity sensor, and
    apply a function to selectively compensate one or more touch signals having a negative touch output value when the grounding condition is indicative of negative capacitance introduced into the device.

16. The device of claim 15, wherein the processor is configured to determine the extent to which negative capacitance is introduced into the device and scale an adjustment amount of compensation proportionate to the determined extent.

17. The device of claim 16, wherein the processor is configured to adjust the one or more touch signals using the determined amount of compensation.

18. The device of claim 15, wherein the processor is configured to determine that no adjustment is required when the grounding condition is not indicative of negative capacitance introduced into the device.

19. The device of claim 15, wherein, when the grounding condition corresponds to the device being poorly grounded or being partially grounded, the processor is configured to activate the provided function to compensate the one or more touch values of the touch nodes for error introduced by the device into the touch values as a result of the device being poorly grounded or being partially grounded.

* * * * *